United States Patent
Mihara et al.

(10) Patent No.: US 10,249,881 B2
(45) Date of Patent: *Apr. 2, 2019

(54) ELECTRODE MATERIAL FOR METAL-AIR BATTERY

(71) Applicant: TORAY INDUSTRIES, INC., Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 15/325,911

(22) PCT Filed: Jul. 9, 2015

(86) PCT No.: PCT/JP2015/069753
§ 371 (c)(1),
(2) Date: Jan. 12, 2017

(87) PCT Pub. No.: WO2016/009935
PCT Pub. Date: Jan. 21, 2016

(65) Prior Publication Data
US 2017/0194650 A1    Jul. 6, 2017

(30) Foreign Application Priority Data

Jul. 15, 2014 (JP) .................................. 2014-144788

(51) Int. Cl.
*H01B 1/04* (2006.01)
*H01M 4/38* (2006.01)
(Continued)

(52) U.S. Cl.
CPC ........... *H01M 4/8605* (2013.01); *C01B 32/00* (2017.08); *C01B 32/05* (2017.08); *H01B 1/04* (2013.01);
(Continued)

(58) Field of Classification Search
CPC .. H01B 1/00; H01B 1/04; H01B 1/24; H01M 4/38; C01B 32/00; C01B 32/15; C01B 32/30
See application file for complete search history.

(56) References Cited

U.S. PATENT DOCUMENTS 7,091,156 B2 * 8/2006 Hirahara ................ H01G 11/24
361/502
2005/0260118 A1 * 11/2005 Lu ......................... B01D 53/228
423/445 R
(Continued)

FOREIGN PATENT DOCUMENTS

JP          6149377        3/1986
JP       2002015737        1/2002
(Continued)

OTHER PUBLICATIONS

Tang et al "Fabrication of a high-strength hydrogel with an interpenetrating network structure", Colloids and Surfaces A: Physiochem. Eng. Aspects 346 (2009) 91-98. (Year: 2009).*
(Continued)

*Primary Examiner* — Mark Kopec
(74) *Attorney, Agent, or Firm* — RatnerPrestia

(57) ABSTRACT

The present invention provides an electrode material for metal-air batteries which has a homogeneous co-continuous structure due to a carbon skeleton and voids and is excellent in terms of permeability to and diffusibility of ions, oxygen, electrolytes, and electrolytic solutions and which, due to the formation of the carbon network, can rapidly diffuse the heat (Continued)

generated by battery reactions and has satisfactory electrical conductivity. The electrode material for metal-air batteries includes a porous carbon material having a co-continuous structure portion in which a skeleton constituted of carbon and voids form a co-continuous structure and which has a structural period, as calculated by X-ray scattering method or X-ray CT method, of 0.002-10 μm.

10 Claims, 1 Drawing Sheet

(51) Int. Cl.
    *C01B 32/00* (2017.01)
    *H01G 11/00* (2013.01)
    *H01M 4/86* (2006.01)
    *H01M 4/96* (2006.01)
    *H01M 12/08* (2006.01)
    *C01B 32/05* (2017.01)

(52) U.S. Cl.
    CPC .............. *H01G 11/00* (2013.01); *H01M 4/86* (2013.01); *H01M 4/96* (2013.01); *H01M 12/08* (2013.01); *C01P 2002/74* (2013.01); *C01P 2004/03* (2013.01); *C01P 2006/16* (2013.01)

(56) References Cited

U.S. PATENT DOCUMENTS

| | | | |
|---|---|---|---|
| 2008/0096061 A1 | 4/2008 | Burchardt | |
| 2009/0269667 A1* | 10/2009 | Antonietti | H01G 11/34 429/231.4 |
| 2013/0084501 A1* | 4/2013 | Wakayama | H01M 4/1397 429/231.8 |
| 2013/0196237 A1 | 8/2013 | Jin | |
| 2013/0330504 A1* | 12/2013 | Morishita | B32B 3/12 428/116 |
| 2017/0331101 A1* | 11/2017 | Tachibana | H01M 4/505 |

FOREIGN PATENT DOCUMENTS

| | | | |
|---|---|---|---|
| JP | 2004071253 | 3/2004 | |
| JP | 2006240902 | 9/2006 | |
| JP | 2008201602 | 9/2008 | |
| JP | 2013109867 | 6/2013 | |
| JP | 2013154346 | 8/2013 | |
| JP | 2014017230 | 1/2014 | |
| WO | 2011003033 A1 | 1/2011 | |
| WO | 2011136186 | 11/2011 | |
| WO | 2012092210 A1 | 7/2012 | |
| WO | WO-2012131628 A1 * | 10/2012 | ............ H01M 4/133 |

OTHER PUBLICATIONS

Han et al "Porous graphite matrix for chemical heat pumps", Carbon vol. 36, No. 12, pp. 1801-1810. (Year: 1998).*
Hwang et al "Capacitance control of carbon aerogel electrodes", Journal of Non-Crystalline Solids 347 (2004) 238-245. (Year: 2004).*
Borchardt et al "Toward a molecular design of porous carbon materials", Materials Today, vol. 20, No. 10, Dec. 2017, pp. 593-610.*
Zakhidov et al "Carbon structures with three-dimensional periodicity at optical wavelengths", Science vol. 282, Oct. 1998, pp. 897-901. (Year: 1998).*
International Search Report and Written Opinion for International Application No. PCT/JP2015/069753, dated Oct. 13, 2015, 7 pages.
Barrett et al., "The Determination of Pore Volume and Area Distributions in Porous Substances. I. Computations from Nitrogen Isotherms", J. Amer. Chem. Soc., vol. 73, Jan. 1951, pp. 373-380.
Extended European Search Report for European Application No. 15 822 480.8, dated Feb. 22, 2018, 7 pages.

* cited by examiner

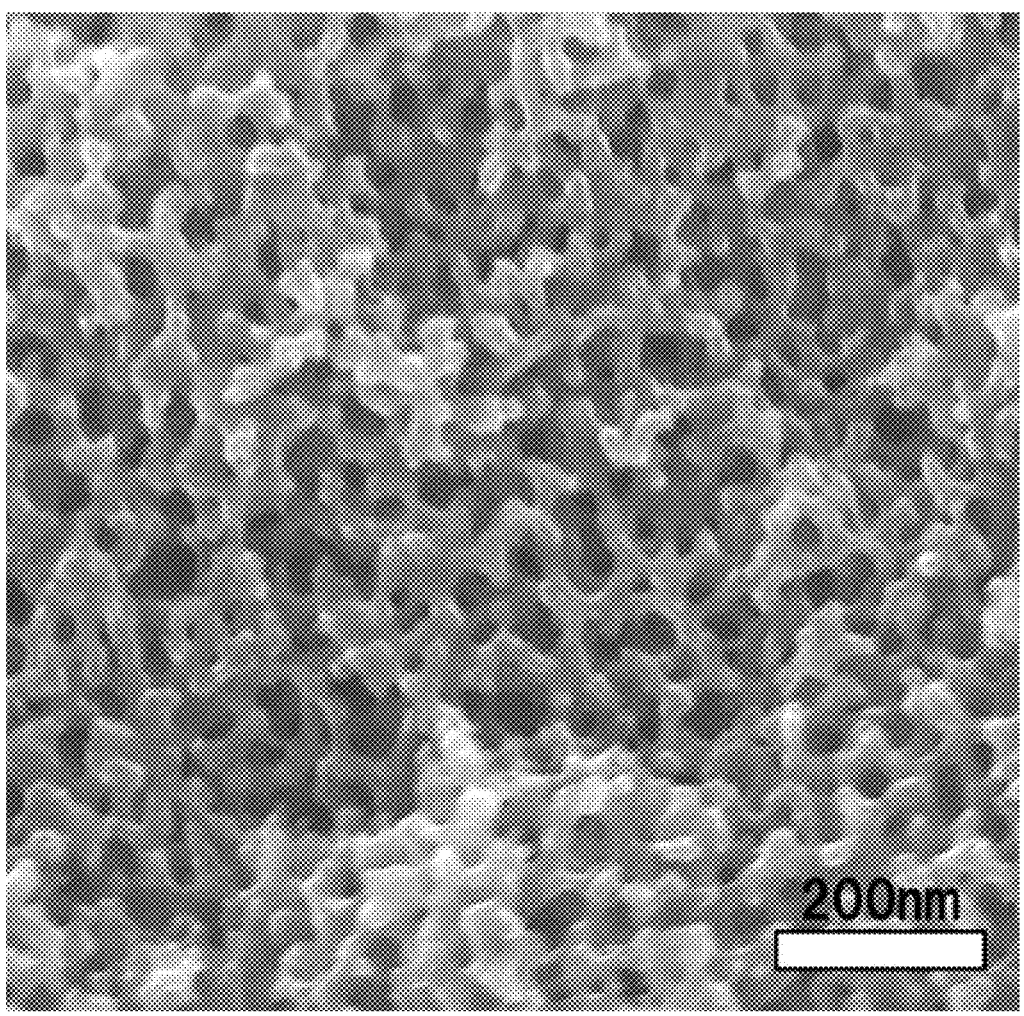

ELECTRODE MATERIAL FOR METAL-AIR BATTERY

CROSS REFERENCE TO RELATED APPLICATIONS

This is the U.S. National Phase application of PCT International Application No. PCT/JP2015/069753, filed Jul. 9, 2015, and claims priority to Japanese Patent Application No. 2014-144788, filed Jul. 15, 2014, the disclosures of each of these applications being incorporated herein by reference in their entireties for all purposes.

FIELD OF THE INVENTION

The present invention relates to an electrode material for metal-air batteries including a porous carbon material.

BACKGROUND OF THE INVENTION

The metal-air battery is a battery which uses oxygen existing in the air as a positive active material and uses a metal as a negative active material. The metal-air battery is characterized in that energy density (electric energy capable of discharging per weight) is high, and downsizing and weight saving are easy since the positive active material does not need to be stored within a battery. The battery currently receives attention as a battery having energy density exceeding a lithium ion battery having high energy density.

Such a metal-air battery is composed of a positive electrode, a negative electrode, an electrolyte, a separator, and an oxygen permeating membrane formed on the positive electrode. A carbon material such as graphite or acetylene black is used for the positive electrode. However, a heretofore used carbon material has a problem that only a capacity which is far from a theoretical capacity of the metal-air battery can be realized.

On the other hand, Patent Document 1 proposes a positive electrode predominantly composed of a carbonaceous substance in which a pore volume of fine pores having a diameter of 1 nm or more is 1.0 ml/g or more. Then, Patent Document 1 describes that the larger the pore volume of fine pores having a diameter of 1 nm or more is, the more the diffusibility of ions and oxygen is enhanced.

Further, Patent Document 2 states a carbon material including fine pores containing mesopores and micropores having a pore size smaller than that of the mesopore in which a carbonaceous wall constituting a shell of the mesopore forms a three-dimensional network structure, the micropore is formed at the carbonaceous wall, the mesopore is an open air hole, and an open air hole portion consecutively forms a combined pore. It is described that since the carbonaceous wall forms a three-dimensional network structure, the diffusibility of lithium ions and oxygen is improved, thus performance is improved.

PATENT DOCUMENTS

Patent Document 1: Japanese Patent Laid-open Publication No. 2002-15737
Patent Document 2: Japanese Patent Laid-open Publication No. 2014-17230

SUMMARY OF THE INVENTION

However, satisfactory performance cannot be attained in diffusibility of ions and oxygen by only increasing the fine pore like Patent Document 1.

Further, in Patent Document 2, the carbonaceous wall forms a three-dimensional network structure; however, diffusibility of ions and oxygen is insufficient.

That is, electrode materials for metal-air batteries using a conventional porous carbon material do not achieve an electrode material composed of a structural body which ensure the diffusibility of ions and oxygen.

It is an object of the present invention to provide an electrode material for metal-air batteries which has a carbon skeleton and voids, is excellent in terms of permeability to and diffusibility of ions, oxygen, electrolytes, and electrolytic solutions, can rapidly diffuse the heat generated by battery reactions, and has satisfactory electrical conductivity.

The present inventors thought that the formation of a network between carbons is important in order to enable to rapidly diffuse the heat generated by battery reactions and in order for electrical conductivity to be satisfactory, and thought that it is preferred for carbon and voids to form a co-continuous structure.

Then, the present inventors noted that in Patent Document 2, the carbonaceous wall and the voids form a co-continuous structure, but the co-continuous structure corresponds to a micropore and does not correspond to a mesopore. That is, the present inventors thought that a size of the void is uneven to a carbonaceous material by only having a co-continuous structure of the carbonaceous material and the void which merely continue, resistance at the time when the fluid passes through becomes large, resulting in insufficient diffusibility of ions and oxygen.

That is, the present inventors thought that a structural design in which a balance between the carbonaceous material and the void is taken into account is important. Then, the present inventors made earnest investigations noting "structural period" described later, and led to the present invention.

The present invention for solving the above-mentioned problems pertains to an electrode material for metal-air batteries comprising a porous carbon material having a co-continuous structure portion in which a skeleton constituted of carbon and voids form a co-continuous structure and which has a structural period, as calculated by X-ray scattering method or X-ray CT method, of 0.002-10 μm.

The electrode material for metal-air batteries of the present invention is excellent in terms of permeability to and diffusibility of ions, oxygen, electrolytes, and electrolytic solutions, and therefore it is possible to efficiently perform an electrochemical reaction, and in the case of using the material for metal-air batteries, a capacity reduction in repeated charge-discharge is small.

BRIEF DESCRIPTION OF THE DRAWING

FIG. 1 shows a scanning electron photomicrograph of a porous carbon material contained in an electrode material for metal-air batteries of Example 1.

DETAILED DESCRIPTION OF EMBODIMENTS OF THE INVENTION

<Electrode Material for Metal-Air Batteries>

The porous carbon material (hereinafter, sometimes referred to as "the porous carbon material of the present invention" for convenience) contained in the electrode material for metal-air batteries (hereinafter, sometimes referred to as merely "electrode material") according to an aspect of the present invention has a co-continuous structure portion in which a carbon skeleton and voids each form a continuous structure (form a co-continuous structure). That is, when for example, a specimen adequately cooled in liquid nitrogen is split with tweezers or the like and surface of the resulting cross-section is observed with a scanning electron microscope (SEM) or the like, a carbon skeleton and voids which is formed as a portion other than the skeleton take on a co-continuous structure. Specifically, as shown in a scanning electron microscope photograph of the porous carbon material of Example 1 of FIG. 1, the porous carbon material has a portion observed as a structure in which a carbon skeleton and voids each continue in depth.

Since the continued carbon skeleton brings about increased electrical conductivity and heat conductivity, the material having low resistance and low loss can be provided. Further, it is also possible to rapidly transfer the heat generated from the system to keep high temperature-uniformity. In addition to these, an effect in which carbon portions support one another to maintain the structural body is produced, and due to this effect, the material has large resistance to deformations such as ones caused by tension or compression accompanying change in volume of the electrode in charging and discharging.

These co-continuous structures are not particularly limited, and examples thereof include the form of a grid and the form of a monolith, and the form of a monolith is preferred in point of being able to exert the above-mentioned effect. The form of a monolith referred to in the present invention refers a form in which the carbon skeleton forms a three-dimensional network structure in the co-continuous structure and is distinguished from an irregular structure such as a structure in which separate particles are aggregated and combined or a structure formed of voids generated by conversely removing the aggregated/combined mold particles and a skeleton around the voids.

Further, the co-continuous structure portion in the porous carbon material according to an embodiment of the present invention has a structural period of 0.002 μm to 10 μm. In the present invention, the structural period L is determined by irradiating a specimen of the porous carbon material of the present invention with X-rays having a wavelength λ by the X-ray scattering method and calculating a structural period from the scattering angle θ corresponding to a local maximal value of peaks of the scattering intensity obtained from its spectrum, using the following equation. When the structural period exceeds 1 μm and the scattering intensity peak of the X-ray cannot be observed, the co-continuous structure portion of the porous carbon material is three-dimensionally photographed by an X-ray CT method, Fourier-transform is applied to the resulting image to obtain a spectrum, and the structural period is similarly calculated. That is, the spectrum referred to in the present invention is data representing a relationship between the one-dimensional scattering angle and the scattering intensity which is obtained by the X-ray scattering method or obtained by the Fourier-transform from the X-ray CT method.

$$L=\lambda/(2 \sin \theta)$$

Structural period: L, λ: wavelength of incident X-rays, θ: scattering angle corresponding to a local maximal value of peak values of the scattering intensity When the structural period of the co-continuous structure is 0.002 μm or more, a fluid can be filled into and/or flown through a void portion, and electrical conductivity and thermal conductivity can be improved through the carbon skeleton. Particularly, it is possible to simultaneously satisfy oxygen permeability, an increase in a contact area with an electrolytic solution and an electric conducting property required for the metal-air batteries. The structural period is preferably 0.005 μm or more, and more preferably 0.01 μm or more. When the structural period is 10 μm or less, a high surface area and high properties can be attained. The structural period is preferably 5 μm or less, and more preferably 1 μm or less. In addition, in performing analysis of the structural period by an X-ray scattering method or an X-ray CT method, the portion not having the co-continuous structure does not have the effect on the analysis because the structural period is out of the above-mentioned range or exceeds a limit of an X-ray microscope resolution. Accordingly, the structural period calculated by the above-mentioned equation is taken as a structural period of a co-continuous structure-forming portion.

The smaller the structural period is, the more the structure is fine, the larger the surface area per unit volume or unit weight is, and the higher the reaction efficiency between ions and oxygen within the electrode can be, and battery characteristics such as a capacity and a charge-discharge rate are enhanced. Further, the larger the structural period is, the more a pressure loss is reduced, and the more a fluid can be filled into and/or flown through a void portion, and therefore resistance during the electrolytic solution flows can be reduced and energy can be efficiently used. From these facts, the structural period of the co-continuous structure portion can be appropriately adjusted in accordance with application of the metal-air battery and desired characteristic.

Further, since spread of the scattering intensity peak in the spectrum corresponds to the structural uniformity, the structural uniformity can be checked by noting a half width of the scattering intensity peak. However, since the half width of the scattering intensity peak tends to increase as the scattering angle θ corresponding to the local maximal value of peaks of the scattering intensity increases, in the present invention, the (a)/(b) which is calculated from the half width of the scattering intensity peak (a) and the scattering angle corresponding to the local maximal value of the scattering intensity peaks (b), is taken as an index of the structural uniformity.

When the continuous porous structure is homogeneous, a value of the (a)/(b) is preferably 1.5 or less. When the homogeneity of the continuous porous structure is high, since there is no narrow flow path which is limiting the permeability and diffusibility of ions, oxygen, electrolytes and electrolytic solutions or no large flow path in which a velocity becomes low, and the porous structure is excellent in uniform permeability and diffusibility, the value of the (a)/(b) is more preferably 1.2 or less and even more preferably 1.0 or less.

Further, the co-continuous structure portion preferably has an average porosity of 10 to 80%. The term "average porosity" refers to a porosity determined by obtaining a precisely formed cross-section of an embedded specimen by the cross-section polisher method (CP method), examining the cross-section at a magnification regulated so as to result in 1±0.1 (nm/pixel) and at a resolution of 700000 pixels or higher, setting in the resultant image a square examination region for calculation in which each side has 512 pixels, and calculating the average porosity using the following equation, in which A is the area of the examination region and B is the area of the pores.

$$\text{Average porosity (\%)}=B/A\times100$$

The porous carbon material having a higher average porosity is preferred because it is excellent in terms of permeability to and diffusibility of ions, oxygen, electrolytes, and electrolytic solutions. The porous carbon material having smaller porosity is excellent in the electrical conductivity and thermal conductivity since the proportion of a carbon material portion is large. In view of these, the average porosity of the co-continuous structure portion is more preferably 15 to 75%, and even more preferably 18 to 70%.

Moreover, it is also preferred that the porous carbon material contained in the electrode material for metal-air batteries of the present invention has fine pores having the average diameter of 0.1 to 10 nm on the surface thereof. The term "surface" refers to all surfaces, in contact with the outside, of the porous carbon material including the surface of a carbon skeleton in the co-continuous structure portion of the carbon material. Although the fine pore can be formed on the surface of a carbon skeleton in the co-continuous structure portion and/or in a portion not substantially having the co-continuous structure described later, the fine pore is preferably formed at least on the surface of a carbon skeleton in the portion having a co-continuous structure. Such fine pores can be formed by activation treatment as described later.

The average diameter of the fine pores is preferably 0.1 nm or more, and more preferably 0.5 nm or more. Further, the average diameter is preferably 5 nm or less, and more preferably 2 nm or less. A chance of a reaction between ions and oxygen can be increased by the fine pores of 0.1 nm or more. Further, since the fine pores are 10 nm or less, it is possible to efficiently perform the diffusion and infiltration of an electrolytic solution. The average diameter of the fine pores is preferably appropriately adjusted to an average diameter about 1.1 to 5.0 times larger than a diameter of an objective ion from the standpoint of an efficient electrode reaction.

Moreover, the pore volume of the porous carbon material is preferably 0.1 $cm^3/g$ or more. When the pore volume is 0.1 $cm^3/g$ or more, since the permeability and diffusibility of ions, oxygen, electrolytes and electrolytic solutions are more improved, it is possible to maintain high battery performance even when the capacity or the charge-discharge rate is increased. From these standpoints, the pore volume is more preferably 1.0 $cm^3/g$ or more, and even more preferably 1.5 $cm^3/g$ or more. The upper limit is not particularly limited; however, when the pore volume exceeds 10 $cm^3/g$, it is not preferred because strength of the porous carbon material is decreased resulting in the breakage of an electrode, and handleability tends to be deteriorated, for example, peeling of an electrode from a current collector.

In addition, as the average diameter of the fine pores, a value obtained by either of a BJH method and a MP method is used. That is, while an appropriate method varies depending on the sizes of pore diameters (e.g., the appropriate method varies at a diameter of 2 nm as a boundary, as described later), if even either of a measured value by the BJH method and a measured value by the MP method is 0.1 to 10 nm, it is judged to have fine pores having the average diameter of 0.1 to 10 nm on the surface of the porous carbon material.

The BJH method and the MP method are a method widely used as a pore size distribution analytical method, and the pore size distribution can be determined based on a desorption isotherm determined by adsorption/desorption of nitrogen on the porous carbon material. The BJH method is a method of analyzing a distribution of a pore volume with respect to a diameter of a fine pore assumed to be cylindrical according to a standard model of Barrett-Joyner-Halenda, and is mainly applicable to fine pores having a diameter of 2 to 200 nm (refer to J. Amer. Chem. Soc., 73, 373, 1951 etc. in detail). The MP method is a method in which an external surface area and an adsorption layer thickness (corresponding a pore radius since a pore shape is assumed as to be cylindrical) of each section of an adsorption isotherm is determined from a change in the slope of a tangent line at each point of the isotherm, and a pore volume is determined based on this and plotted with respect to the adsorption layer thickness to obtain a pore size distribution (refer to Journal of Colloid and Interface Science, 26, 45, 1968 etc. in detail), and this method is mainly applicable to fine pores having a diameter of 0.4 to 2 nm.

In addition, in the porous carbon material of the present invention, there is a possibility that the voids of the co-continuous structure portion have the effect on a pore size distribution or a pore volume which are measured by the BJH method or the MP method. That is, there is a possibility that these measured values are obtained as a value reflecting not only purely fine pores but also existence of voids; however, in even such a case, measured values determined by these methods are considered as the pore diameter and the pore volume in the present invention.

Further, the porous carbon material of the present invention preferably has a BET specific surface area of 30 $m^2/g$ or more. The BET specific surface area is preferably 200 $m^2/g$ or more, more preferably 1000 $m^2/g$ or more, and even more preferably 2000 $m^2/g$ or more. When the BET specific surface area is 30 $m^2/g$ or more, a reaction interface between an ion and oxygen is increased, and therefore battery performance is improved. The upper limit of the BET specific surface area is not particularly limited; however, in the case of the specific surface area exceeding 4500 $m^2/g$, strength of the porous carbon material is decreased resulting in the breakage of an electrode, a capacity per unit volume tends to be decreased, and handleability tends to be deteriorated, for example, peeling of an electrode from a current collector. In addition, the BET specific surface area in the present invention can be determined by measuring an adsorption isotherm by adsorption/desorption of nitrogen on the porous carbon material according to JIS R 1626 (1996) and calculating the measured data based on a BET equation.

In addition, in the case of an electrode material formed by compositing an active material with the porous carbon material as described later, a numerical value range of the structural period, the specific surface area, the pore volume and the porosity in the present invention are values in a state before including the active material. With respect to the electrode material formed by compositing the active material, whether values measured after removing the active material by wet etching are applied or not-applied to the numerical value range, is determined.

[Portion Having Substantially No Co-Continuous Structure]

It is also preferred aspect that the porous carbon material of the present invention includes a portion not substantially having the co-continuous structure (hereinafter, sometimes referred to as merely "portion not having the co-continuous structure"). The term "portion not substantially having the co-continuous structure" means that a portion in which no distinct voids are observed because of having a size less than the resolution exists in an area larger than a square region in which a side corresponds to 3 times of the structural period L calculated by the X-ray scattering method or the X-ray CT method when a cross-section formed by the cross-section polisher method (CP method) is examined at a magnification resulting in 1±0.1 (nm/pixel).

Since carbon is closely packed in the portion not substantially having the co-continuous structure, the portion has high electrical conductivity. Because of this, the electrical conductivity and thermal conductivity can be maintained at a certain level or higher, and in the case where the portion is used, for example, as a battery material, it is possible to rapidly discharge the heat of reaction from the system and to keep the resistance to electron transfer low. Further, the presence of the portion not having the co-continuous structure enables the resistance to compression failure to increase. When the proportion of the portion not having the co-continuous structure is 5% by volume or more, it is preferred since it is possible to prevent the fluid from leaking out of the co-continuous structure portion or maintain the electrical conductivity and thermal conductivity at a high level.

Further, the porous carbon material is a material having the effect of assigning a role of a flow path and functions of electrical conductivity/thermal conductivity to the co-continuous structure portion and the portion not having the co-continuous structure, respectively, and specifically, voids in the co-continuous structure portion can be utilized as a permeation/diffusion path of an electrolytic solutions, oxygen and ions, and in the portion not having the co-continuous structure, the electrical conductivity and thermal conductivity can be maintained at a high level.

The porous carbon material of the present invention preferably contains carbon crystal grains. The inclusion of carbon crystal grains enables the porous carbon material of the present invention to further enhance thermal conductivity and electrical conductivity through the carbon crystal grain portion. Further, the carbon crystal grain tends to have a high elastic modulus as compared with a portion which is substantially amorphous other than the carbon crystal grains, and hence, there is significant improvement observed in the elastic modulus and compressive strength of the whole porous carbon material of the present invention. Therefore, the porous carbon material is not ruptured along with the volume change for an electrode material which significantly changes in volume at the time of charging and discharging. Accordingly, even though the charging and discharging are repeated, a characteristic of the porous carbon material rarely changes. Further, in the case where the porous carbon material of the present invention has the form of a fiber or a film, this material is not easily ruptured and can contribute to the efficient production of a final product having excellent quality at the time of handling, modularizing, an assembly step, etc.

Although the carbon crystal grain size is not particularly limited, the smaller the carbon crystal grain size, the more the absolute distance between the carbon crystal grains tends to approach one another, and the carbon crystal grain allows the electrical conductivity and thermal conductivity to improve without significantly changing the mechanical property. Further, the larger the carbon crystal grain size is, the more heat resistance, chemical resistance and chemical stability against degradation due to oxidation of the carbon crystal grain tend to be enhanced. In view of these, the carbon crystal grain size is preferably 1 to 1000 nm. In particular, when the carbon crystal grain size is 1 to 100 nm, the mechanical property, and electrical conductivity and thermal conductivity are in excellent balance. This configuration is hence preferred. Further, when the carbon crystal grain size is 50 to 1000 nm, heat resistance, chemical resistance and chemical stability against degradation due to oxidation or the like are enhanced, and therefore characteristics which are preferred as an electrode can be provided.

When the porous carbon material of the present invention is thinly cut out using a convergence ion beam or the like, and the cut-out piece is then observed with a transmission electron microscope or the like, the presence or absence of the carbon crystal grain can be confirmed with black contrasts as shown in FIG. 2. The carbon crystal grain is present in a region having a low brightness and appearing dark as compared with the other places. As for the carbon crystal grain, first, a median filter having a radius of 2 pixels is applied to a photographed image, a brightness histogram of the image is then obtained, the brightness value is divided by the maximum frequency value near the median, and the resultant value is expressed as the frequency by percentage. Straight line approximation is performed using the value of a point at which the frequency from the dark side where the brightness value is low exceeds 20% and the value of a point at which the frequency exceeds 50%, and the brightness value at the time of setting the frequency to 0% is calculated from the formula of the straight line thus obtained (the x fragment is calculated when the brightness and the frequency are regarded as x and y, respectively). A group of pixels having lower brightness values than the resultant brightness value represents the carbon crystal grain. Here, among the group of pixels, less than 30 pixels which are recognized as noises are excluded from those representing the carbon crystal grain. Each of the carbon crystal grain size can be determined by obtaining an area of the black contrast portion and converting the area to a diameter of a circle equivalent to the area. The term "carbon crystal grain size" simply described herein means a number average value, and specifically, the carbon crystal grain size can be determined by the method described in Example to be described later.

A proportion, in which the area of the black contrast portion accounts for the whole area used for the analysis, is referred to as an existence proportion of the carbon crystal grain, the existence proportion of the carbon crystal grain is preferably 0.1% or more. Not less than 0.1% of such existence proportion thereof allows electrical conductivity and thermal conductivity to be sufficiently imparted to the material. The upper limit of the existence proportion of the carbon crystal grain is not particularly limited. However, when the upper limit thereof is less than 70%, the mechanical property, and electrical conductivity and thermal conductivity are in excellent balance. This configuration is hence preferred.

The carbon crystal which constitutes the carbon crystal grain of the present invention means a carbon portion having a crystal structure with a unit cell or having a structure in which the crystal structure is slightly irregular, and as a perfect one as the so-called crystal, even a graphite crystal or a diamond crystal may be used. If the carbon portion is the graphite crystal or has a structure in which the graphite crystal structure is slightly irregular, it is suitable because it is possible to enhance the electrical conductivity and thermal conductivity of the porous carbon material. Further, when the carbon crystal is a diamond crystal or has a slightly irregular structure of a diamond crystal, it becomes possible to significantly enhance the mechanical properties such as tension and compression, and the elastic modulus and strength can also be easily balanced. Therefore, it is suitable since handleability of the electrode is improved.

Whether the carbon crystal is a graphite crystal or has a slightly irregular structure of a graphite crystal can be judged when the X-ray diffraction profile measured by a powder method has a peak near a diffraction angle of 24.5 to 26.6°. In particular, in the case where the carbon crystal has a slightly irregular structure of a graphite crystal, electrical conductivity, thermal conductivity, and mechanical property can be easily balanced. This embodiment is hence preferred. In the case where the carbon crystal has a slightly irregular structure of a graphite crystal, it can be judged by whether the X-ray diffraction profile measured by a powder method has a peak between diffraction angles of 25 to 26°.

Whether the carbon crystal is a diamond crystal or has a slightly irregular structure of a diamond crystal can be judged when the X-ray diffraction profile measured by a powder method has a peak near a diffraction angle of 42 to 45°.

Although the carbon crystal grains may be contained in the branches which constitute a co-continuous structure or may be contained in the other portions, it is preferable that the carbon crystal grains are contained at least in the branches which constitute a co-continuous structure. When the carbon crystal grains are present in the branches which constitute a co-continuous structure, the function to mediate electrical conductivity and thermal conductivity can be remarkably exhibited and it also becomes easy to improve the mechanical property and the chemical stability of the whole porous carbon material. Further, in particular, by including the carbon crystal grains in the branches which constitute the co-continuous structure, the carbon crystal grains become close in physical distance to the pores which constitute the co-continuous structure. Therefore, when the carbon crystal grains exhibit the function due to a contact with, for example, an electrolytic solution, adsorption, desorption, reaction, etc. can be efficiently proceeded.

In the energy dispersive X-ray spectrometry measurement of the carbon crystal grain portion observed with the above-mentioned transmission electron microscope, the existence proportion of the carbon atom is calculated from the X-ray intensity equivalent to the carbon atom, and the existence proportion of the carbon atom in the carbon crystal grain is preferably 50% or more. When the existence proportion of the carbon atom is not less than 50%, it is possible to maintain the electrical conductivity and thermal conductivity of the carbon crystal grain sufficiently high.

Further, when the electrode material of the present invention is used for a negative electrode, the active material is composited with the porous carbon material. Herein, examples of the active material include a metal alone, an alloy, a metal oxide, a metal nitride and the like. Examples of the metal alone include lithium, sodium, magnesium, potassium, calcium, aluminum, zinc and the like. Among these metals, lithium which easily becomes an ion and is excellent in a capacity per unit weight because of a small atomic weight is more preferred. When the electrode material of the present invention is used for a negative electrode, since the porous carbon material restricts a volume of a portion in which the active material is supported in voids of the co-continuous structure portion of the porous carbon material, the formation of dendrite due to the active material on the surface of or within the negative electrode during charging can be suppressed to achieve the effect of preventing the accident of a short-circuit, and hence the electrode material is preferred. Examples of the alloy include alloys of elements exemplified in the metal alone; and alloys of the above-mentioned element and an element other than exemplified elements, for example, carbon, nitrogen, boron, sulfur, phosphorus, fluorine, chlorine, bromine, iodine, silicon, germanium, or transition metal. Since chemical stability of the active material is improved by alloying a metal, it becomes possible to keep a state of charge stable for a long time.

A composite form is not particularly limited, and examples thereof include a state in which a composite is filled into the void portion of the co-continuous structure in the form of a particle, a film or a needle. When a large amount is composited, a capacity can be large, and when a small amount is composited, efficiency of a reaction with an electrolytic solution is increased and hence rate characteristics are improved. From these standpoints, a composite ratio is preferably 1 to 80 wt % with respect to the porous carbon material. The composite ratio can be determined by observing, with a scanning electron microscope or the like, a cross-section of an embedded specimen precisely formed by the cross-section polisher method (CP method), and calculating an area ratio between a carbon portion and other portion. Herein, a portion in which carbon elements are present in a ratio of 50 wt % or more when measured by energy dispersive X-ray analysis combined with a scanning electron microscope or the like, is defined as the carbon portion. The void portion is excluded from calculation.

[Shape of Porous Carbon Material]

The shape of the porous carbon material of the present invention is not particularly limited, and examples thereof include a bulk shape, rod shape, flat plate shape, disk shape, and spherical shape. Particularly, the porous carbon material is preferably in the form of a fiber, film, or powder.

The term "in the form of a fiber" refers to a shape in which the average length is at least 100 times longer than the average diameter. The material may be filaments or long fibers, or may be staples, short fibers, or chopped strands. The shape of the cross-section thereof is not limited at all, and the cross-section can have any shape such as a round cross-section, a multi-leafed cross-section, e.g., triangular cross-section, a flat cross-section, or a hollow cross-section, and the shape of the cross-section may have an acute portion in which part of the cross-section is lacked.

The average diameter of the fibers is not particularly limited, and can be determined arbitrarily; however, the average diameter is preferably 10 nm or more from the standpoint of maintaining handleability and a porous property. Further, from the standpoint of ensuring flexural rigidity to improve the handleability, the average diameter thereof is preferably 5000 μm or less.

In the case where the porous carbon material of the present invention has the form of a fiber, it is possible and preferred to form any fibrous structural body such as a fabric, a knit, a braided article, paper and felt in composing the electrode the present invention. Particularly, when the porous carbon material is the fibrous structural body, this is a preferred aspect since the porosity can be higher than the porous carbon material of the form of a film or fiber, and diffusion/permeation path of an electrolytic solution and oxygen permeability associated with charge-discharge can be kept high. These fibrous structural bodies preferably have a thickness of 1 to 5000 μm since handleability, electric conducting property, and permeability and diffusibility of ions, oxygen and the like are excellent.

The form of a film can be suitably used for an electrode since the co-continuous structure portion can be used as a sheet as-is. Particularly, when the porous carbon material is a film which has a portion having a co-continuous structure and a portion not substantially having the co-continuous structure on one-side or both-side surfaces thereof, it is preferred since the portion not substantially having the co-continuous structure can maintain electrical conductivity and thermal conductivity at a high level and allows only gas to permeate the portion to thereby prevent vaporization of the electrolytic solution and allow the ions and oxygen to react with efficiency. Further, when the portion not substantially having the co-continuous structure is in the form in which the portion is formed only on one-side of the film, it is preferred since the co-continuous structure portion opposite to the portion not substantially having the co-continuous structure facilitates permeation and diffusion of electrolytic solutions and ions into the film.

The thickness of the film is not particularly limited, and can be determined arbitrarily in accordance with desired battery performance. The larger the thickness of a film is, the more its strength increases, resulting in excellent handleability, and the smaller the thickness is, the higher resistance to deformation due to bending the film has, resulting in less damage of the film. From these points, the thickness of the film is preferably at least 10 nm and at most 5000 μm.

When the porous carbon material has the form of particles, it is particularly preferred since a high density electrode can be easily formed by undergoing steps of forming a paste, applying and drying the paste by a publicly known method. Further, when the portion not having the co-continuous structure accounts for some of each particle, it is preferred since the electrical conductivity and thermal conductivity within the particle can be enhanced, and the effect that compressive strength of the particle itself is increased to reduce the deterioration of performance under high pressure can be expected.

A diameter of the particle is not particularly limited and can be appropriately selected in accordance with applications; however, it is preferably 10 nm to 10 mm since this facilitates to handle the particles. Particularly, since particles having a diameter of 10 μm or less, as a solid content for constituting a paste, enable to obtain an extremely smooth paste, it is possible to prevent the defects such as paste-peeling, cracks and the like in the step of application or the like. On the other hand, when the diameter is 0.1 μm or more, it is preferred since the co-continuous structure can be sufficiently formed within the particle and a reaction occasion can be increased in addition to the permeability and diffusibility of ions, oxygen, and electrolytic solutions.

The electrode material for metal-air batteries of the present invention may be the above-mentioned porous carbon material itself, and other materials may be composited and/or mixed with the porous carbon material as required. In so doing, as described above, the porous carbon material is preferably in the form of a particle. Examples of other materials include a binder and a conduction aid. Further, when the proportion of the porous carbon material is 60% or more, it is preferred since a reaction occasion can be increased in addition to the permeability and diffusibility of ions, oxygen, and electrolytic solutions.

The binder is preferably a polymer from the standpoint of having the ability to bind the porous carbon material and the standpoint of having the ability to facilitate application of a paste in being formed into a paste. The polymer can be used singly or can be used as a composite of two or more types of polymers. Examples of the polymer can include polyethylene, polypropylene, polystyrene, polymethylmethacrylate, polyacrylate, polyvinyl acetate, polyvinyl alcohol, polyacrylonitrile, acrylonitrile-styrene resin, acrylonitrile-butadiene-styrene resin, polycarbonate, polyester, nylon, polyimide, polyacetal, polyethylene glycol, polypropylene glycol, polybutylene glycol, cellulose and derivatives thereof, polytetrafluoroethylene, polyvinylidene fluoride, vinyl chloride, vinylidene chloride and the like, and among these, crystalline polymers are preferred from the standpoint of ensuring chemical/physical stabilities in an electrolytic solution. Examples of the crystalline polymers include polyethylene, polypropylene, polystyrene, polymethylmethacrylate, polyvinyl alcohol, polyacrylonitrile, polyester, nylon, polyacetal, polytetrafluoroethylene, polyvinylidene fluoride, vinyl chloride, vinylidene chloride and the like. Among these, polymers in which halogen is added are preferred from the standpoints of oxygen permeability and chemical stability. From these standpoints, the binder preferably includes at least partially polytetrafluoroethylene, polyvinylidene fluoride, vinyl chloride, vinylidene chloride and modified product thereof.

The amount of the binder to be added is not particularly limited; however, it is preferably set to such an extent that the ability to bind the porous carbon material and the ability to facilitate application of a paste in being formed into a paste are adequately exerted and performance of the porous carbon material is not impaired. For this reason, the amount of the binder to be added is preferably 1 to 50 wt %.

Further, it is also preferred to include a conduction aid since the effect of reducing electric resistance as an electrode is anticipated. The conduction aid can be used particularly without a limit as long as it has electrical conductivity, and an electrochemically stable aid is preferred from the standpoint of using an electrolytic solution stably. From this standpoint, the conduction aid predominantly composed of carbon is preferred. Herein, the term "predominantly composed of carbon" means that carbon atoms constitute 80 wt % or more of the porous carbon material. Examples of the conduction aid include a graphite powder, carbon black, carbon nanotubes, and graphene. Further, it is also preferred that the portion not having the co-continuous structure in the porous carbon material of the present invention is used for allowing the material to have the effect as a conduction aid. An amount of the conduction aid to be added is not particularly limited; however, it is preferred to determine the addition amount within such an extent that the characteristic of the porous carbon material is not impaired and from the standpoint of adequately imparting the electric conducting property. From these standpoints, the amount of the conduction aid to be added is preferably 0.1 to 20 wt %.

<Process for Producing Electrode Material for Metal-Air Batteries>

The porous carbon material to be used for the electrode material for metal-air batteries of the present invention can be produced, for example, by a production process including: a step in which 10 to 90 wt % of a carbonizable resin and 90 to 10 wt % of an eliminable resin are brought into a compatibly mixed state to obtain a resin mixture (step 1); a step in which the resin mixture in a compatibly mixed state is caused to undergo phase separation and the separated phases are fixed (step 2); and a step in which the fixed material is carbonized by pyrolysis under heat (step 3).

[Step 1]

Step 1 is a step in which 10 to 90 wt % of a carbonizable resin and 90 to 10 wt % of an eliminable resin are brought into a compatibly mixed state to obtain a resin mixture.

Herein, the carbonizable resin is a resin which carbonizes upon pyrolysis and remains as a carbon material, and a resin having the carbonization yield of 40% or more is preferred. For example, both a thermoplastic resin and a thermosetting resin can be used as the carbonizable resin, and examples of the thermoplastic resin include polyphenylene oxide, polyvinyl alcohol, polyacrylonitrile, phenolic resins, and wholly aromatic polyesters, and examples of the thermosetting resin include unsaturated polyester resins, alkyd resins, melamine resins, urea resins, polyimide resins, diallyl phthalate resins, lignin resins, and urethane resins. Polyacrylonitrile and phenolic resins are preferred, and polyacrylonitrile is more preferred from the standpoints of cost and productivity. Particularly, in the present invention, it is a preferred embodiment to use polyacrylonitrile since a high specific surface area is attained even in the polyacrylonitrile. These resins may be used either alone or in a mixed state. The carbonization yield referred to herein means a yield obtained by measuring changes in weight of a resin at the time of raising a temperature at a rate of 10° C./min in a nitrogen atmosphere by a thermogravimetric (TG) technique, and dividing a difference between a weight at room temperature and a weight at 800° C. by the weight at room temperature.

Meanwhile, the eliminable resin is a resin which can be removed after the step 2 to be described later, and can be preferably removed in at least any of the following stages: simultaneously with a treatment for imparting infusibility; after the treatment for imparting infusibility; and simultaneously with the pyrolysis. A removal rate of a resin is preferably 80 wt % or more, and more preferably 90 wt % or more when the resin finally becomes a porous carbon material. A method of removing the eliminable resin is not particularly limited, and suitable methods include: a method in which the eliminable resin is chemically removed, for example, by conducting depolymerization using a chemical; a method in which the eliminable resin is removed by a solvent capable of dissolving the eliminable resin; and a method in which the resin mixture is heated to lower the molecular weight of the eliminable resin by thermal decomposition, thereby removing the eliminable resin. These techniques can be used alone or in combination thereof, and in the case of using a combination, the techniques may be simultaneously performed or separately performed.

As the method in which the resin is chemically removed, a method in which the resin is hydrolyzed using an acid or an alkali is preferred from the standpoints of economic efficiency and handleability. Examples of resins which are susceptible to hydrolysis by acids or alkalis include polyesters, polycarbonates, and polyamides.

Preferred examples of the method in which the eliminable resin is removed by a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by a solvent include polyolefins such as polyethylene, polypropylene, and polystyrene, acrylic resins, methacrylic resins, polyvinylpyrrolidone, aliphatic polyesters, and polycarbonates. Particularly, from a standpoint of solubility in a solvent, such an eliminable resin is more preferably an amorphous resin, and examples thereof include polystyrene, methacrylic resins, polycarbonates, and polyvinylpyrrolidone.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferable that the eliminable resin is, among those resins, a resin which disappears in the step 3 described later, through thermal decomposition when the carbonizable resin is carbonized by pyrolysis. It is preferable that the eliminable resin is a resin which does not undergo a large chemical change when the carbonizable resin is subjected to the treatment for imparting infusibility described later, and which, after pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In the step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, particularly in the case of a system in which at least one of the carbonizable resin and the eliminable resin has been dissolved in a solvent, preferred examples include one in which the phase separation described later is induced by the infiltration of a nonsolvent.

The solvent to be added is not particularly limited, and preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties, and therefore it is preferred that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, and most preferably 2.0 or less.

Specific examples of combinations of carbonizable resin and eliminable resin to be brought into a compatibly mixed state, in the case where the system contains no solvent, include polyphenylene oxide/polystyrene, polyphenylene oxide/styrene-acrylonitrile copolymer, wholly aromatic polyester/polyethylene terephthalate, wholly aromatic polyester/polyethylene naphthalate, and wholly aromatic polyester/polycarbonate. Specific examples of the combinations, in the case where the system contains a solvent, include polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch.

Methods for mixing the carbonizable resin with the eliminable resin are not limited, and various publicly known mixing techniques can be employed so long as even mixing is possible therewith. Specific examples thereof include a rotary mixer having stirring blades and a kneading extruder with screws.

It is also a preferred embodiment that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be appropriately selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a precursor for the porous carbon material, which has excellent quality.

In the step 1, 10 to 90 wt % of the carbonizable resin is mixed with 90 to 10 wt % of the eliminable resin. In the case where the proportions of the carbonizable resin and eliminable resin are within those ranges, an optimal void size and an optimal porosity can be arbitrarily designed, and therefore those ranges are preferred. When the proportion of the carbonizable resin is 10 wt % or more, it is possible to retain mechanical strength in the carbonized material, and it is also possible to improve yield, and therefore the proportion is preferred. Meanwhile, when the proportion of the carbonizable material is 90 wt % or less, the eliminable resin can efficiently form voids, and therefore the proportion is preferred.

A mixing ratio between the carbonizable resin and the eliminable resin can be arbitrarily selected within the above range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to the so-called partial composition by increasing or reducing the amount of the carbonizable resin.

It is also a preferred embodiment that a solvent is added when the carbonizable resin and the eliminable resin are mixed with each other. The addition of a solvent not only lowers the viscosity of the carbonizable resin and eliminable resin to facilitate molding but also makes the carbonizable resin and the eliminable resin easy to bring into a compatibly mixed state. The solvent referred to herein is not also particularly limited, and any solvent which is liquid at ordinary temperature and in which at least one of the carbonizable resin and the eliminable resin is soluble or swellable may be used. It is a more preferred embodiment that a solvent in which both the carbonizable resin and the eliminable resin dissolve is used because the compatibility between both resins can be improved.

It is preferred that the amount of the solvent to be added is 20 wt % or more with respect to the total weight of the carbonizable resin and the eliminable resin, from the standpoints of improving the compatibility between the carbonizable resin and the eliminable resin and lowering the viscosity thereof to improve the flowability. Further, on the other hand, from the standpoint of the cost of the recovery and recycling of the solvent, the amount of the solvent to be added is preferably 90 wt % or less with respect to the total weight of the carbonizable resin and the eliminable resin.

[Step 2]

The step 2 is a step in which the resin mixture which has been brought into a compatibly mixed state in the step 1 is caused to undergo phase separation to form a microstructure and the separated phases are fixed.

Phase separation of the carbonizable resin and eliminable resin that have been mixed together can be induced by various physical and chemical techniques, and examples of a method of inducing the phase separation include: a heat-induced phase separation method in which phase separation is induced by a temperature change; a nonsolvent-induced phase separation method in which phase separation is induced by adding a nonsolvent; a shear-induced phase separation method in which phase separation is induced by a physical field; an orientation-induced phase separation method; an electric field-induced phase separation method; a magnetic field-induced phase separation method; a pressure-induced phase separation method; and a reaction-induced phase separation method in which phase separation is induced using a chemical reaction. Among these methods, the heat-induced phase separation method and the nonsolvent-induction phase separation method are preferred in point of being able to easily produce the porous carbon material of the present invention.

These phase separation methods can be used alone or in combination thereof. Specific examples of methods in the case of using a combination include: a method in which the mixture is passed through a coagulating bath to cause nonsolvent-induced phase separation and the mixture is then heated to cause heat-induced phase separation; a method in which nonsolvent-induced phase separation and heat-induced phase separation are simultaneously caused by controlling the temperature of a coagulating bath; and a method in which the material ejected from a spinning nozzle is cooled to cause heat-induced phase separation and is then brought into contact with a nonsolvent.

The expression "accompanied with no chemical reaction" in inducing the phase separation means that either of the carbonizable resin and eliminable resin which have been mixed undergoes no change in primary structure before and after the mixing. The term "primary structure" represents the chemical structure which constitutes the carbonizable resin or the eliminable resin. By being accompanied with no chemical reaction such as polymerization in inducing the phase separation, changes in characteristics of a resin such as significant improvement in elastic modulus is suppressed, and the resin can be easily formed into an optional structure such as a fiber, a film or the like.

[Removal of Eliminable Resin]

It is preferable that the resin mixture in which a microstructure resulting from the phase separation has been fixed in the step 2, is subjected to removal of the eliminable resin before being subjected to the carbonization step (step 3), or simultaneously with the carbonization step, or in both thereof. Methods for the removal are not particularly limited, and any method may be used so long as the eliminable resin can be removed thereby. Specifically, suitable methods include: a method in which the eliminable resin is chemically decomposed and lowered in molecular weight using an acid, alkali, or enzyme and is removed thereby; a method in which the eliminable resin is dissolved away by a solvent capable of dissolving the eliminable resin; and a method in which the eliminable resin is depolymerized using radiation, such as electron beams, gamma rays, ultraviolet rays, or infrared rays, or heat to thereby remove the eliminable resin.

Particularly, in the case where the eliminable resin can be removed by thermal decomposition, a heat treatment may be conducted beforehand at such a temperature that at least 80 wt % of the eliminable resin disappears, or the eliminable resin may be gasified by thermal decomposition and then removed in the carbonization step (step 3) or in the treatment for imparting infusibility described later. It is a more suitable embodiment that the method is selected in which the eliminable resin is gasified by thermal decomposition and then removed simultaneously with heat treatment in the carbonization step (step 3) or in the treatment for imparting infusibility described later, from the standpoint of reducing the number of steps to enhance the productivity.

[Treatment for Imparting Infusibility]

It is preferred that a precursor material being the resin mixture in which a microstructure resulting from the phase separation has been fixed in the step 2, is subjected to the treatment for imparting infusibility before being subjected to the carbonization step (step 3). Methods for the treatment for imparting infusibility are not particularly limited, and publicly known methods can be used. Specific examples of the methods include: a method in which the resin mixture is heated in the presence of oxygen to thereby cause oxidative crosslinking; a method in which the resin mixture is irradiated with high-energy rays such as electron beams or gamma rays to form a crosslinked structure; and a method in which the resin mixture is impregnated with or mixed with a substance having a reactive group to forma crosslinked structure. Among these methods, the method in which the resin mixture is heated in the presence of oxygen to thereby cause oxidative crosslinking is preferred because the process is simple and production cost can be kept low. These techniques can be used alone or in combination thereof, and the techniques may be used either simultaneously or separately.

The heating temperature in the method in which the resin mixture is heated in the presence of oxygen to thereby cause oxidative crosslinking is preferably 150° C. or higher from the standpoint of causing the crosslinking reaction to proceed efficiently, and is preferably 350° C. or lower from the standpoint of preventing the yield from being impaired by a weight loss due to the thermal decomposition, combustion, etc. of the carbonizable resin.

There are no particular limitations on oxygen concentration during the treatment; however, it is preferred to supply a gas having an oxygen concentration of 18% or higher, in particular, to supply air as it is, because use of such a gas makes it possible to reduce the production cost. Methods for supplying the gas are not particularly limited, and examples thereof include a method in which air is supplied as it is to the heating device and a method in which pure oxygen is supplied to the heating device using a bombe or the like.

Examples of the method in which the resin mixture is irradiated with high-energy rays such as electron beams or gamma rays to form a crosslinked structure include a method in which a commercially available electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1000 kGy or less from the standpoint of preventing the material strength from being deteriorated by a decrease in molecular weight due to cleavage of the main chain.

Examples of the method in which the resin mixture is impregnated with or mixed with a substance having a reactive group to form a crosslinked structure include: a method in which the resin mixture is impregnated with a low-molecular-weight compound having a reactive group, followed by heating or irradiating with high-energy rays to cause a crosslinking reaction to proceed; and a method in which a low-molecular-weight compound having a reactive group is mixed beforehand, followed by heating or irradiating with high-energy rays to cause a crosslinking reaction to proceed.

A suitable method is to conduct the removal of the eliminable resin simultaneously with the treatment for imparting infusibility, because the benefit of a cost reduction due to the reduction in the number of steps can be expected.

[Step 3]

The step 3 is a step of pyrolyzing and carbonizing the resin mixture in which a microstructure resulting from the phase separation has been fixed in the step 2, or the carbonizable resin in the case where the eliminable resin has been removed to thereby obtain a carbide.

It is preferred that the pyrolysis is conducted by heating the resin mixture to 600° C. or higher in an inert gas atmosphere. Herein, the term "inert gas" refers to a gas which is chemically inactive at the time of heating, and specific examples thereof include helium, neon, nitrogen, argon, krypton, xenon, and carbon dioxide. It is preferred from the standpoint of economical efficiency that nitrogen or argon is used among these. In the case where the carbonization temperature is set to 1500° C. or higher, it is preferred to use argon from the standpoint of inhibiting the formation of nitrides. When the heating temperature is higher, the crystallinity of the porous carbon material can be enhanced, and therefore it is possible to enhance heat resistance and chemical stability.

The flow rate of the inert gas is not limited so long as the oxygen concentration within the heating device can be sufficiently lowered, and it is preferred to appropriately select an optimal value in accordance with the size of the heating device, amount of the feed material to be supplied, heating temperature, etc. The upper limit of the flow rate is not particularly limited. However, it is preferred that the flow rate of the inert gas is appropriately set in accordance with a temperature distribution or the design of the heating device, from the standpoints of economical efficiency and of reducing temperature differences within the heating device. Furthermore, in the case where the gases which generate during the carbonization can be sufficiently discharged from the system, a porous carbon material having excellent quality can be obtained, and therefore this embodiment is more preferred. It is, therefore, preferred to determine the flow rate of the inert gas so that the concentration of the generated gases in the system is 3,000 ppm or less.

There is no upper limit on the temperature at which the resin mixture is heated. However, temperatures not higher than 3000° C. are preferred from the standpoint of economical efficiency because the equipment requires no special processing.

With respect to heating methods in the case where the carbonization treatment is continuously performed, a method in which the material is continuously fed to and taken out from the heating device kept at a constant temperature, using rollers, conveyor, or the like is preferred because the productivity can be enhanced.

On the other hand, in the case where a batch treatment is conducted in a heating device, there is no particular lower limit on the heating rate and cooling rate. However, rates of 1° C./min or higher are preferred because the time period required for the heating and cooling can be shortened to thereby enhance the productivity. Further, upper limits of the temperature raising rate and temperature lowering rate are not particularly limited; however, it is preferred to employ as the upper limit on the heating rate and cooling rate a rate which is lower than the thermal shock resistance of the material that constitutes the heating device.

[Activation Treatment]

An activation treatment is preferably conducted in order to obtain a porous carbon material in which fine pores further grow by activating the carbide obtained in the step 3. A method of activation treatment is not particularly limited, and examples thereof include a gas activation method, a chemical activation method or the like. The gas activation method is a method in which oxygen, steam, carbon dioxide, or air is used as an activation agent and a carbide is heated at a temperature of 400° C. to 1500° C., preferably 500° C. to 900° C. for several minutes to several hours to form pores. Further, the chemical activation method is a method in which as an activation agent, one or more of zinc chloride, iron chloride, calcium phosphate, calcium hydroxide, potassium hydroxide, magnesium carbonate, sodium carbonate, potassium carbonate, calcium carbonate, sulfuric acid, sodium sulfate, potassium sulfate and the like, are used and a carbide is heated for several minutes to several hours, and the resulting carbide is washed with water or hydrochloric acid as required, and dried after pH adjustment.

When the activation is made more proceed or an amount of the activation agent to be mixed is increased, the BET specific surface area generally increases, and the pore size tends to increase. Further, the amount of the activation agent to be mixed is set to preferably 0.5 part by weight or more, more preferably 1.0 part by weight or more, and even more preferably 4 parts by weight or more with respect to 1 part by weight of an intended carbon raw material. An upper limit is not particularly limited; however, it is commonly 10 parts by weight or less. Further, the pore size by the chemical activation method tends to be increased more than the pore size by the gas activation method.

In the present invention, the chemical activation method is preferably employed because it can increase the pore size and can increase the BET specific surface area. Particularly, a method of activating with an alkaline chemical such as calcium hydroxide, potassium hydroxide or potassium carbonate is preferably employed.

In the case of activation with the alkaline chemical, an amount of an acidic functional group tends to increase and it may be not preferred. In this case, the acidic functional group can be reduced by heating the carbide in an atmosphere of gas containing nitrogen, hydrogen or carbon monoxide.

[Pulverization Treatment]

A porous carbon material in which the porous carbon material prepared in the above manner is formed into particles through a pulverization treatment, or a porous carbon material produced by further undergoing a step in which the porous carbon material is formed into particles through a pulverization treatment at any stage after the step 2 also constitutes an aspect of the porous carbon material of the present invention. A conventionally publicly known method can be selected for the pulverization treatment and it is preferable to appropriately select the method in accordance with the particle size to be attained through the pulverization treatment and the treatment amount. Examples of the method for the pulverization treatment include a ball mill, bead mill, and jet mill. Although the pulverization treatment may be continuous or batchwise, a continuous treatment is preferred from the standpoint of production efficiency. A filler to be filled into the ball mill is appropriately selected; however, it is preferable that a material based on a metal oxide, such as alumina, zirconia, or titania, or a material obtained by coating stainless steel, iron, or the like as cores with a nylon, polyolefin, fluorinated polyolefin, or the like is used for applications where inclusion of a metallic material is undesirable. For other applications, use of a metal such as stainless steel, nickel, or iron can be suitably used.

It is also a preferred embodiment from the standpoint of heightening the efficiency of pulverization that a pulverization aid is used during the pulverization. The pulverization aid is selected arbitrarily from among water, alcohols, glycols, ketones, etc. Ethanol and methanol are preferred alcohols from the standpoints of ease of availability and cost. Ethanol and methanol are preferred alcohols from the standpoints of ease of availability and cost, and in the case of using a glycol, ethylene glycol, diethylene glycol, propylene glycol, or the like is preferable. In the case of using a ketone, acetone, ethyl methyl ketone, diethyl ketone, or the like is preferable.

Sizes of particles of the carbide having undergone the pulverization treatment are leveled by classification and classified carbide can form a uniform structural body in, for example, a filling material or an additive to a paste. Hence, it is possible to stabilize the efficiency of filling and the step of paste application. Consequently, it can be expected to increase the production efficiency to attain a cost reduction. With respect to a particle diameter, it is preferred to appropriately select the diameter in accordance with applications of the pulverized carbide.

<Electrode>

The electrode material for metal-air batteries of the present invention may use a porous carbon material (electrode material) in the form of a film as-is, or may use one obtained by forming a porous carbon material (electrode material) in the form of a fiber into a fabric, a knit, a braided article, paper or felt, or may be formed by applying a porous carbon material in the form of a particle formed into a paste as an electrode material onto a current collector.

When the porous carbon material in the form of a film is used as-is, a current collector can be composited with a porous carbon material in the form of a film having undergone the step 3 by applying an existing metal-compositing technology such as press-forming or vapor deposition as required. Further, when a portion not having a continuous porous structure exists particularly in at least one surface of a porous carbon material in the form of a film, it is also preferred to the portion not having a continuous porous structure as a current collector.

When one obtained by forming the porous carbon material in the form of a fiber into paper or felt is used, a publicly known method of producing a fabric, a knit, a braided article or paper, or a method of forming the porous carbon material in the form of a fiber into felt can be appropriately used. Further, in performing the above-mentioned step, the current collector may be prepared in advance as a substrate and is composited with the porous carbon material in the form of a fiber in a production step, or the current collector may be composited the porous carbon material by a technique such as press-forming or vapor deposition later.

A method of forming the porous carbon material in the form of a particle into an electrode is not particularly limited, and a method of forming the porous carbon material into a paste and applying the paste to form a sheet, and a method of melting/kneading the porous carbon material with a binder to form a sheet, respectively publicly known, can be employed.

Particularly, when the electrode of the present invention is used as a negative electrode, it is also preferred that an active material such as a metal, an alloy or a metal oxide is formed into fine particles and composited with the porous carbon material of the present invention or that the active material is formed into a solution once using an acid or base and composited with the porous carbon material through impregnation and drying. In this case, since there may be cases where the metal compound remains as an acid or base within the porous carbon material, it is also suitable that the active material is appropriately neutralized, or the metal compound is oxidized or reduced to be returned to a metal by heating in an atmosphere of an inert gas, an oxidizing gas or a reducing gas. Particularly, it is preferred from the standpoint of easy progress of a reaction to reduce the metal compound in an atmosphere of an inert gas or a reducing gas to return it to a metal. Examples thereof include noble gases such as helium, neon, argon, krypton and xenon; nitrogen, and carbon dioxide. Among these, argon, nitrogen, and carbon dioxide are suitable because of ease of availability. Examples of the reducing gas include hydrogen, ammonia, carbon monoxide, hydrogen sulfide, formaldehyde and the like. These gases may be used as-is, or is preferably used as a mixture in which the above-mentioned inert gas is mixed in an arbitrary ratio. Further, compositing with the active material can also be achieved by making a starting material or an intermediate of the porous carbon material include a metal, a metal oxide or a precursor thereof at any stage before pyrolysis.

EXAMPLES

Preferred examples of the present invention will be described below, but the following description should not limit the present invention at all.
<Evaluation Technique>
[Structural Period of Co-Continuous Structure Portion]
(1) X-Ray Scattering Method A porous carbon material was sandwiched between specimen plates, and the position of a CuKα line source and the positions of the specimen and a two-dimensional detector were regulated so that information on scattering angles less than 10 degrees was obtained from the X-ray source obtained from the CuKα line source. From the image data (brightness information) obtained from the two-dimensional detector, the data on the central portion which had been affected by a beam stopper were excluded. Radius vectors from the beam center were set, and the values of brightness for the range of 360° at angular intervals of 1° were summed up to obtain a scattered-light-intensity distribution curve. From the scattering angle θ corresponding to the local maximum value of a peak in the curve obtained, the structural period L of the co-continuous structure portion was obtained using the following equation.

(2) X-Ray CT Method

In the case where the structural period was 1 μm or more and the peak of X-ray scattering intensity was not observed, a continuously rotating image was taken with 0.3° step in a range of not less than 180° using an X-ray microscope to obtain a CT image. The obtained CT image was subjected to Fourier transformation to obtain a scattered intensity distribution curve, and the structural period L was then obtained using the following equation in the same method as above.

$L=\lambda/(2 \sin \theta)$

Structural period: L, λ: wavelength of incident X-rays, θ: scattering angle corresponding to a local maximal value of peak values of the scattering intensity
[Index of Structural Uniformity]

From scattering angle (b) corresponding to a local maximal value of peak values of the scattering intensity, and a half (a) which the peak of the scattering intensity has, and a value calculated by (a)/(b) is take as an index of the structural uniformity.
[X-ray Diffraction Peak]

A porous carbon material was pulverized using a ball mill and the pulverized material was set on a specimen plate. Thereafter, a powder method was conducted using an X-ray diffractometer RINT2500, manufactured by Rigaku Corporation to thereby obtain an X-ray diffraction profile.
[Presence/Absence of Carbon Crystal Grain and Carbon Crystal Grain Size, Existence Proportion of Carbon Crystal Grain]

Among porous carbon materials, an ultrathin fragment of a portion having a co-continuous structure was prepared for observation with a transmission electron microscope using a convergence ion beam, and this fragment was observed with the transmission electron microscope. In the case where black contrast portions were present in the branches of the co-continuous structure illustrated in FIG. 2, it was judged that the portion having the co-continuous structure had carbon crystal grains. Further, ten portions of the obtained black contrast portions were taken randomly, and the area of the black contrast portion was determined based on the pixel size of the image of the photographed transmission electron microscope photograph. The area thereof was converted to a diameter of a circle equivalent to the area. The average value of the ten portions thus taken was calculated and the resulting value was determined as the carbon crystal grain size. A proportion in which the area of the obtained black contrast portion accounts for the whole area used for the analysis, was determined as an existence proportion of the carbon crystal grain.
[Existence Proportion of Carbon Atom]

With respect to ten black contrast portions selected randomly among the ultrathin fragments in which the sizes of the above-mentioned carbon crystal grains were measured, the existence proportion of the carbon atom per weight was determined by energy dispersive X-ray spectrometry, and the average of the existence proportions thereof in the ten portions was determined as the existence proportion of the carbon atom.
[Average Porosity]

An electrode material including a porous carbon material was embedded in a resin, and a cross-section of the electrode material including the porous carbon material was thereafter exposed by breaking a specimen or using a razor blade or the like. Using SM-09010, manufactured by JEOL Ltd., the specimen surface was irradiated with argon ion beams at an accelerating voltage of 5.5 kV to etch the surface. A central part of the resultant cross-section of the electrode material was examined with a scanning secondary-electron microscope at a magnification regulated so as to result in 1±0.1 (nm/pixel) and at a resolution of 700000 pixels or higher, and a square examination region for calculation in which each side had 512 pixels was set in the resulting image. The average porosity was calculated using the following equation, in which A was the area of the examination region and B was the area of the pores, eliminable resin portions or portions in which a substance other than carbon, such as metal, was composited. In this calculation, a portion in which a ratio of a carbon element, measured by energy dispersive X-ray analysis, is less than 10%, was defined as the portion in which a substance other than carbon was composited.

Average porosity (%)=$B/A$×100

[BET Specific Surface Area, Fine Pore Diameter]

Using, "BELSORP-18PLUS-HT" manufactured by MicrotracBEL Corp., a specimen was deaerated at 300° C. for about 5 hours under a reduced pressure, and then nitrogen adsorption-desorption of the specimen at a temperature of 77 K was measured by a multipoint method using liquid nitrogen. The specific surface area measurement was performed by a BET method and pore distribution analysis (pore diameter, pore volume) was performed by a MP method or a BJH method.

Example 1

Into a separable flask were introduced 70 g of polyacrylonitrile (Mw: 150000, carbon yield: 58%) manufactured by Polysciences, Inc., 70 g of polyvinylpyrrolidone (Mw: 40000) manufactured by Sigma Aldrich, and 400 g of dimethyl sulfoxide (DMSO) manufactured by Wakenyaku Co. Ltd., as a solvent, and the contents were heated at 150° C. for 3 hours with stirring and refluxing, thereby preparing a uniform and transparent solution. In this solution, the concentration of the polyacrylonitrile and the concentration of the polyvinylpyrrolidone were 13% by weight each.

The DMSO solution obtained was cooled to 25° C. and then ejected at a rate of 3 mL/min from a one-orifice nozzle having an orifice diameter of 0.6 mm, and the extrudate was led into a pure-water coagulating bath kept at 25° C., subsequently taken off at a rate of 5 m/min, and accumulated in a vat to thereby obtain raw fibers. In this operation, the air gap was set at 5 mm, and the length of immersion in the coagulating bath was 15 cm. The raw fibers obtained were translucent and had undergone phase separation.

The raw fibers obtained were dried for 1 hour in a circulating dryer kept at 25° C., thereby removing the water present on the fiber surface. Thereafter, vacuum drying was conducted at 25° C. for 5 hours to obtain dried raw fibers as a precursor material.

The raw fibers as a precursor material were thereafter introduced into an electric furnace kept at 250° C. and heated in an oxygen atmosphere for 1 hour, thereby performing a treatment for imparting infusibility. The raw fibers which had undergone the treatment for imparting infusibility had changed to black in color.

The infusible raw fibers obtained were subjected to a carbonization treatment under the conditions of a nitrogen flow rate of 1 L/min, heating rate of 10° C./min, maximum temperature of 1500° C., and holding time of 1 minute, thereby obtaining fibrous porous carbon material having a co-continuous structure. A cross-section of the porous carbon material was observed, and consequently a fiber diameter was 160 μm, and a thickness of a portion which was formed on the fiber surface and does not have the co-continuous structure was 5 μm. Furthermore, an even co-continuous structure was formed in the fiber center part. The structural period of the resultant porous carbon material was 75 nm. The index of the structural uniformity was 0.8.

Then, the porous carbon material was pulverized using a ball mill, and then coarse particles were removed with a sieve with mesh size of 20 μm. The resulting porous carbon material in the form of a particle (90 parts by weight) and polytetrafluoroethylene (PTFE) binder (10 parts by weight) were mixed and stirred in an ethanol solvent to obtain a paste-like electrode material, and the electrode material was formed into a sheet by roll-pressing to obtain an electrode. For a test cell, a stainless steel plate as a negative current collector, metal lithium as a negative active material, a polyolefin-based porous membrane as a separator, and the electrode of the present invention were laminated. Further, with respect to an electrolytic solution, N,N-diethyl-N-methyl-N-(2-methoxyethyl) ammonium bis(trifluoromethane sulfonyl)amide (DEMETFSA, manufactured by KANTO CHEMICAL CO., INC.) was used as a solvent, and as an electrolyte, LiTFSA (lithium bis(trifluoromethane sulfonyl)amide, KISHIDA CHEMICAL Co., Ltd.) was mixed in an Ar atmosphere so as to be 0.32 mol/kg in concentration, and the resulting mixture was stirred overnight to form an electrolytic solution. This metal-air battery was held at 60° C. for 5 hours, and then was discharged at a current density of 0.1 mA/cm$^2$ to 2.3 V. The results are shown in Table 1.

TABLE 1

| | Unit | Example 1 |
| --- | --- | --- |
| Structural Period | nm | 75 |
| Index of Structural Uniformity | — | 0.8 |
| Binder | — | PTFE |
| Amount of Binder | part(s) by weight | 10 |
| Electrolyte | — | LiTFSA |
| Concentration | mol/kg | 0.32 |
| Electrolytic Solution | | DEMETFSA |
| Discharge Capacity | mAh/g | 2101 |

The invention claimed is:

1. An electrode material for metal-air batteries comprising a porous carbon material having a co-continuous structure portion in which a skeleton constituted of carbon and voids form a co-continuous structure and which has a structural period, as calculated by X-ray scattering method or X-ray CT method, of 0.002 μm to 10 μm.

2. The electrode material for metal-air batteries according to claim 1, wherein a ratio ((a)/(b)) between a half width of a scattering intensity peak (a) and a scattering angle corresponding to a local maximal value of a scattering intensity peaks (b) used for calculation of the structural period in the spectrum obtained from the X-ray scattering method or the X-ray CT method, is 1.5 or less.

3. The electrode material for metal-air batteries according to claim 1, wherein the porous carbon material has fine pores having the average diameter of 0.1 to 10 nm on the surface thereof.

4. The electrode material for metal-air batteries according to claim 1, wherein the porous carbon material has a portion not substantially forming a co-continuous structure.

5. The electrode material for metal-air batteries according to claim 1, wherein the porous carbon material includes a carbon crystal grain.

6. The electrode material for metal-air batteries according to claim 1 which is formed by further compositing an active material with the porous carbon material.

7. The electrode material for metal-air batteries according to claim 1, wherein the porous carbon material has the form of a fiber or a film.

8. The electrode material for metal-air batteries according to claim 1, wherein the porous carbon material has a particle form.

9. The electrode material for metal-air batteries according to claim 8 further comprising a binder.

10. The electrode material for metal-air batteries according to claim 1, wherein a weight ratio of the porous carbon material is 60% or more.

* * * * *